UNITED STATES PATENT OFFICE.

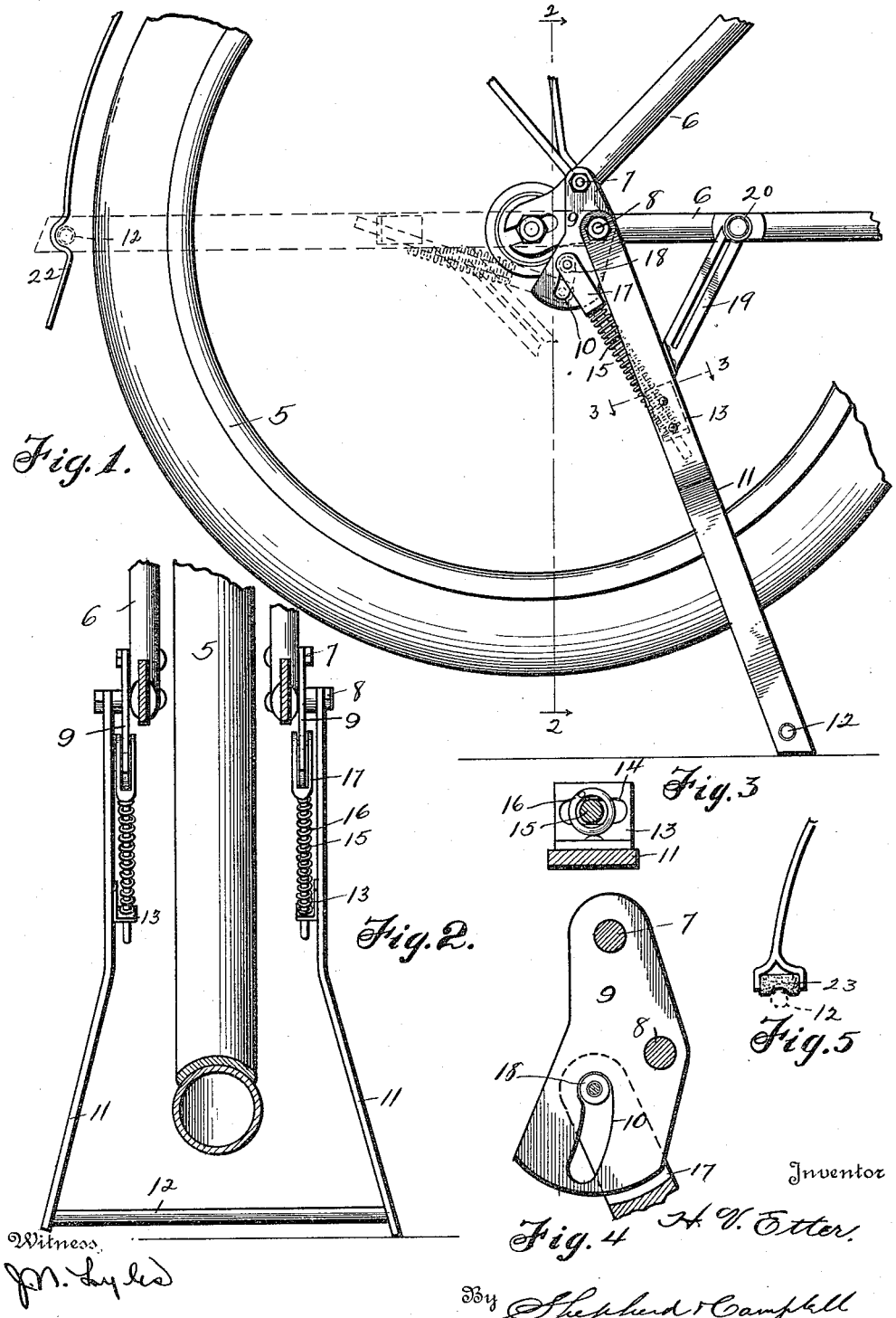

HARVEY V. ETTER, OF NORFOLK, VIRGINIA, ASSIGNOR OF ONE-HALF TO E. R. BEADLE, OF NORFOLK, VIRGINIA.

MOTOR-CYCLE STAND.

1,168,294.   Specification of Letters Patent.   Patented Jan. 18, 1916.

Application filed July 17, 1915. Serial No. 40,405.

*To all whom it may concern:*

Be it known that I, HARVEY V. ETTER, a citizen of the United States, residing at Norfolk, in the county of Norfolk and State of Virginia, have invented certain new and useful Improvements in Motor-Cycle Stands, of which the following is a specification.

This invention relates to stands for motorcycles and it has for its object the provision of an improved device of this character which will support the rear wheel of the motorcycle in an elevated position, and which stand is adapted to be swung into a position to support the rear wheel of the motorcycle, or to be itself swung into an elevated position in the usual way, said stand being maintained in either of these two positions by the action of a single spring.

It is a principal object of the present invention to provide a stand of the character above set forth in which the parts are so arranged that the stand may be held in its elevated position by the action of the spring means alone and without the employment of a latch so that it will not be necessary for the rider to bend down and release the latch before the stand can be moved to its forward and wheel supporting position.

It is also an object of the invention to so construct and arrange the parts that the spring means will bear against the stand to hold the same in its elevated position, at such an angle that rattling of the parts will be effectively prevented.

Further objects and advantages of the invention will be set forth in the detailed description which now follows.

In the accompanying drawing Figure 1 is a side elevation of a part of the rear wheel of a motorcycle illustrating the stand applied thereto. Fig. 2 is a vertical sectional view. Fig. 3 is a detail sectional view through the stand upon line 3—3 of Fig. 1. Fig. 4 is a detail view of a cam hereinafter described, and Fig. 5 is a detail view of a bumper which may be employed in lieu of the latch.

Like numerals designate corresponding parts in all of the figures of the drawing.

Referring to the drawing, the figure 5 designates the rear wheel of a motorcycle, and 6 the rear fork of the motorcycle frame. Secured to this rear fork by bolts 7 and 8 are cam plates 9 having slots 10 formed therein. A stand comprising the side bars 11 and the bar 12, is pivoted upon the bolts 8, and the side bars 11 carry L shaped brackets 13 which brackets have elongated openings 14, and are surrounded by springs 16 which springs bear between the brackets 13 and forked ends 17 of the plungers. These forked ends of the plungers embrace the cam plates 9 and carry rollers 18, said rollers being disposed within the slot 10. Stop arms 19 are secured to side bars 11 and abut against stops 20, only one of which is shown, carried by the motorcycle frame, said stops serving to limit the forward movement of the side bars 11 under the action of the springs 16.

It will be apparent that when the rollers 18, brackets 13 and pivot point 8 are in alinement with each other the device will be upon a dead center, but that when the frame passes forwardly of this point the springs will act to force the stand forwardly until the stops 20 are engaged by the stop arms 19, and that when the stand is thrown rearwardly beyond said dead center, the springs will act to throw the stand to the elevated position shown in dotted lines in Fig. 1. The purpose of the slot 10 is to bring the plungers and the springs to such an angle with relation to the side bars at the termination of the upward movement of the side bars that these springs will serve to hold the stand firmly in its elevated position to prevent rattling. These springs may serve to throw the stand upwardly into engagement with the usual latch 22 or they may serve to hold the tie bar 12 into engagement with a rubber bumper 23, illustrated in Fig. 5, and in order to effectively accomplish the foregoing object, the slots 10 are provided, the rollers 18 riding downwardly in said slots (until the plungers occupy the position shown in dotted lines in Fig. 1,) at the termination of the upward movement of the stand, it being readily apparent that this position is such that the thrust of the springs more effectively serves to hold the stand in its elevated position than would be the case if the plungers maintained their former position.

From the foregoing description it will be apparent that the stand will be held in either its lowered or its raised position by the action of the same spring, and that when thrown to its lowered position it will maintain said lowered position even though the rear wheel of the motorcycle be lifted from the ground as is often necessary; furthermore, the changing of the angle at which the springs thrust against the stand at the termination of the upward movement of the stand serves to hold the stand in its elevated position without the necessity of employing a latch and in such a manner that rattling of the parts is prevented. The efficiency with which this latter object is accomplished arises from the change of the angle brought about by the provision of the slots 10.

When the latch is dispensed with, as may be done, with the present construction, the rider may manipulate the stand with the foot thereby avoiding the necessity of stooping to an uncomfortable position in order to release the stand.

Although the springs, plungers, and cam plates have been shown as being duplicated upon opposite sides of the motorcycle, it is to be understood that the invention contemplates the use of these elements upon only one side of the motorcycle if desired.

While the elements shown and described are well adapted to serve the purpose for which they are intended, it is to be understood that the invention is not limited to the precise construction set forth, but that it includes within its purview such changes as come within the spirit of the appended claims.

Having described my invention, what I claim is:

1. The combination with a motorcycle of a stand pivoted thereto, and pivoted spring means acting upon said stand in such manner as to throw it upon opposite sides of a dead center, said stand when thrown to one side of the dead center serving to support the rear wheel of a motorcycle in an elevated position and being moved by said spring means to an elevated position when moved to the opposite side of said dead center, and means for mounting said springs in such manner that their fulcrum is shifted to increase their angle of thrust with relation to the stand near the termination of the upward movement of said stand.

2. In a device of the character described the combination with a motorcycle of a stand, the upper end of which is pivoted to said motorcycle, spring actuated members bearing between a part of said motorcycle and said stand and acting to move said stand in opposite directions upon each side of a dead center.

3. In a device of the character described the combination with a motorcycle, of a stand, the upper end of which is pivoted to said motorcycle, spring actuated members bearing between a part of said motorcycle and said stand and acting to move said stand in opposite directions upon each side of a dead center and means for increasing the angle between said spring actuated means and the stand at the termination of the upward movement of said stand.

4. In a device of the character described the combination with a motorcycle of a stand pivoted thereto, cam plates fixed thereto, slots formed in said plates, plungers, bearing elements carried by said plungers and moving in said slots, and springs bearing between parts of said plungers and parts of said stand.

5. In a device of the character described the combination with a motorcycle, of a stand pivoted thereto, cam plates fixed thereto, slots formed in said plates, plungers, bearing elements carried by said plungers and moving in said slots, and springs bearing between parts of said plungers and parts of said stand, said slots being of such shape that said spring means ride in the upper portions thereof until the stand nearly reaches its upward limit of movement, and then ride to the lower part of said slots whereby the angle of thrust of the springs upon the stand is increased.

In testimony whereof I affix my signature in presence of two witnesses.

HARVEY V. ETTER.

Witnesses:
CHARLES J. SMITH,
JOHN A. BARR.

Copies of this patent may be obtained for five cents each, by addressing the "Commissioner of Patents, Washington, D. C."